(12) United States Patent
Mondini et al.

(10) Patent No.: US 12,391,417 B2
(45) Date of Patent: Aug. 19, 2025

(54) APPARATUS FOR APPLYING A LID TO A SUPPORT CONTAINING A PRODUCT

(71) Applicant: G.MONDINI S.P.A., Cologne (IT)

(72) Inventors: Paolo Carlo Mondini, Cologne (IT); Daniel Paderni, Castegnato (IT); Silvano Bosio, Cologne (IT)

(73) Assignee: G.MONDINI S.P.A., Cologne (IT)

( * ) Notice: Subject to any disclaimer, the term of this patent is extended or adjusted under 35 U.S.C. 154(b) by 0 days.

(21) Appl. No.: 18/758,290

(22) Filed: Jun. 28, 2024

(65) Prior Publication Data
US 2025/0019102 A1    Jan. 16, 2025

(30) Foreign Application Priority Data
Jul. 10, 2023   (IT) ................. 102023000014391

(51) Int. Cl.
B65B 7/28   (2006.01)
B65B 7/16   (2006.01)
B65B 51/14  (2006.01)

(52) U.S. Cl.
CPC .............. B65B 7/285 (2013.01); B65B 7/164 (2013.01); B65B 7/165 (2013.01); B65B 7/2857 (2013.01); B65B 7/2878 (2013.01); B65B 7/2892 (2013.01); B65B 51/14 (2013.01)

(58) Field of Classification Search
CPC ......... B65B 7/164; B65B 7/165; B65B 7/285; B65B 7/2857; B65B 7/2871; B65B 7/2878; B65B 7/2892; B65B 51/14; B29C 66/53461; B29C 66/612
USPC .................................. 53/329.3, 329.5, 389.3
See application file for complete search history.

(56) References Cited

U.S. PATENT DOCUMENTS

| | | | | |
|---|---|---|---|---|
| 1,846,670 A | * | 2/1932 | Barbieri | B65B 7/2892 229/5.5 |
| 2,950,590 A | * | 8/1960 | O'Brien et al. | B65B 7/285 53/355 |
| 3,338,027 A | * | 8/1967 | Amberg et al. | B65B 7/2878 53/341 |

(Continued)

FOREIGN PATENT DOCUMENTS

| | | | |
|---|---|---|---|
| DE | 2718574 A1 | 11/1978 | |
| DE | 3016235 A1 * | 10/1980 | B65B 7/2878 |

OTHER PUBLICATIONS

Search Report and Written Opinion from Italian Patent Application No. 102023000014391, Date of Completion of Search: Jan. 24, 2024, 10 pages.

*Primary Examiner* — Stephen F. Gerrity
(74) *Attorney, Agent, or Firm* — Chrisman Gallo Tochtrop LLC

(57) ABSTRACT

An apparatus for applying a lid (2) to a support (3) containing a product. The apparatus (1) comprises a supporting element (10), having a contact portion (13), and a closing element (11), having a fixing portion (17), which are movable between a home position and a working position, in which the closing element (11) is partly inserted into the seat (12) having one or more lateral surfaces (16) defining the contact portion (13). When the two elements (10), (11) are in the working position, the fixing portion (17) is in the seat (12) and the two portions (17), (13) are coupled for clamping a part of the lid (2) and a part of at least one lateral wall (5). The fixing portion (17) is configured to fix the part of the lid (2) and the part of the lateral wall (5) which are clamped.

20 Claims, 13 Drawing Sheets

(56) References Cited

U.S. PATENT DOCUMENTS

| | | | | |
|---|---|---|---|---|
| 3,832,828 | A | * | 9/1974 | Martin .................. B65B 31/021 53/511 |
| 4,261,502 | A | * | 4/1981 | Ohmori ............. B29C 66/81427 229/404 |
| 4,296,588 | A | * | 10/1981 | Vetter .................. B65B 31/028 53/86 |
| 4,736,568 | A | * | 4/1988 | Shaw et al. ............. B65B 7/164 53/290 |
| 4,982,555 | A | * | 1/1991 | Ingemann ............. B65B 7/2878 156/68 |
| 5,152,418 | A | * | 10/1992 | Kroeschell et al. .......................... B29C 66/1286 220/613 |
| 7,841,156 | B2 | * | 11/2010 | Naroska et al. ........ B65B 7/164 53/329.2 |
| 2004/0206048 | A1 | * | 10/2004 | Iuchi et al. ............. B65B 7/164 53/329.2 |
| 2019/0062032 | A1 | * | 2/2019 | Mader et al. ......... B29C 66/131 |

* cited by examiner

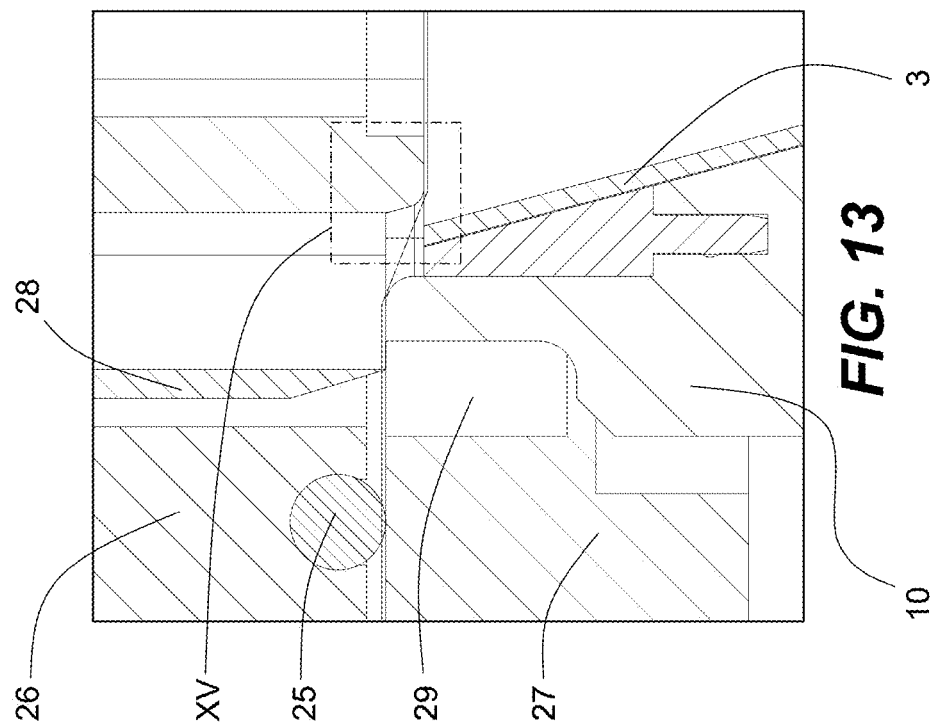
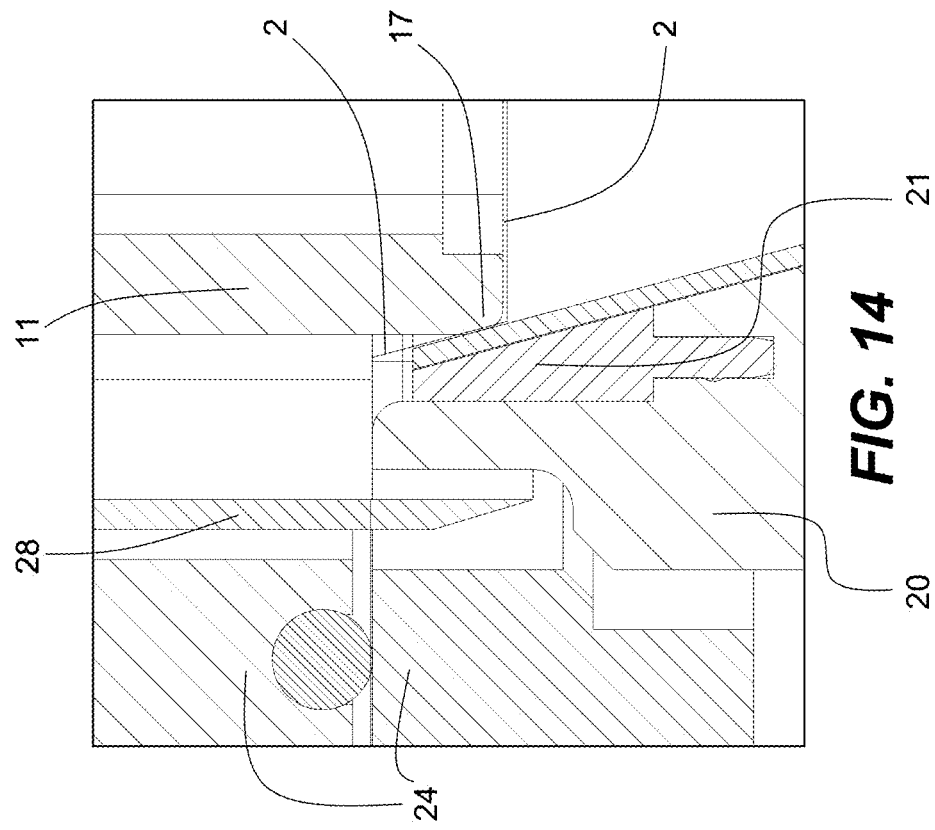

APPARATUS FOR APPLYING A LID TO A SUPPORT CONTAINING A PRODUCT

This invention relates to an apparatus for applying a lid to a support containing a product, as well as a method for applying the lid to the support, and also relates to a pack obtainable by means of the method, and can advantageously be applied in the case in which the product is a food product. In particular, this invention is preferably applied in the case in which the product is produce, such as fruit and/or vegetables.

More specifically, this invention is intended for an apparatus for applying the lid to a support of the type which comprises a bottom wall and one or more lateral walls, the latter extending upwards starting from a perimetric edge of the bottom wall. The lateral walls and the bottom wall together delimit a housing into which the product to be packaged is inserted, the product being placed on the bottom wall.

This invention is intended in particular for the case of a product for which the packaging does not have to guarantee a fluid-tight seal relative to the outside, since there is no risk of the product rapidly perishing if in contact with air. Unlike what happens with rapidly perishable products, such as meat and cheeses, for which sealed packaging is usually made using skin packaging or MAP packaging, in the case of fruit and vegetables usually contact with air is not a problem which, in the short term, can have a significant effect on the quality of the product.

However, even this type of product is usually packaged by first positioning the product on the bottom wall of a support, and then either inserting the support into a bag (usually made of plastic material) which must then be closed, or wrapping around the support a covering film (such as a transparent film made of plastic material) or fixing the lid to the outer wall of the support (for example in the case of prismatic containers with a triangular base intended to contain sandwiches in which the lid is constituted of a flap of material connected to one of the walls of the support and is then folded over the free opening).

The supports used in the prior art apparatuses and for this type of packaging are without a flange extending outwards from the container starting from an upper edge of the lateral walls. Consequently, for this type of packaging it is not even possible to use the prior art apparatuses configured for applying a closing film to a support by applying the closing film to a flange which extends outwards from the container, starting from an upper edge of the lateral walls. Insertion of the support into a bag or wrapping of the plastic film around the support require the use of a large quantity of material. In particular, in the case in which the covering film is wrapped around the support, it is often necessary to wrap the film around it many times, thereby wasting a lot of material.

The use of a lid fixed to the outside of the support is usually visually unappealing and is usually not obtainable with direct adhesion of the lid to the support, instead only by applying a label or another adhesive element. In this context the technical purpose which forms the basis of this invention is to provide an apparatus and a method for applying a lid to a support containing a product which at least partly overcome the above-mentioned disadvantages.

In particular the technical purpose of this invention is to provide an apparatus and a method for applying a lid to a support containing a product which at least in some applications allow the use of less material than that used by the prior art apparatuses.

It is also the technical purpose of this invention to provide an apparatus and a method for applying a lid even to a support without a flange extending outwards from the container starting from an upper edge of the lateral walls. The technical purpose specified and the aims indicated are substantially achieved by an apparatus and a method for applying a lid to a support containing a product, and by the pack obtainable with them, in accordance with what is defined in the independent claims. Particular embodiments of this invention are defined in the corresponding dependent claims.

Further features and the advantages of this invention will be more apparent from the detailed description of several preferred, non-limiting embodiments of an apparatus for applying a lid to a support containing a product illustrated in the accompanying drawings, in which.

Figure 4:
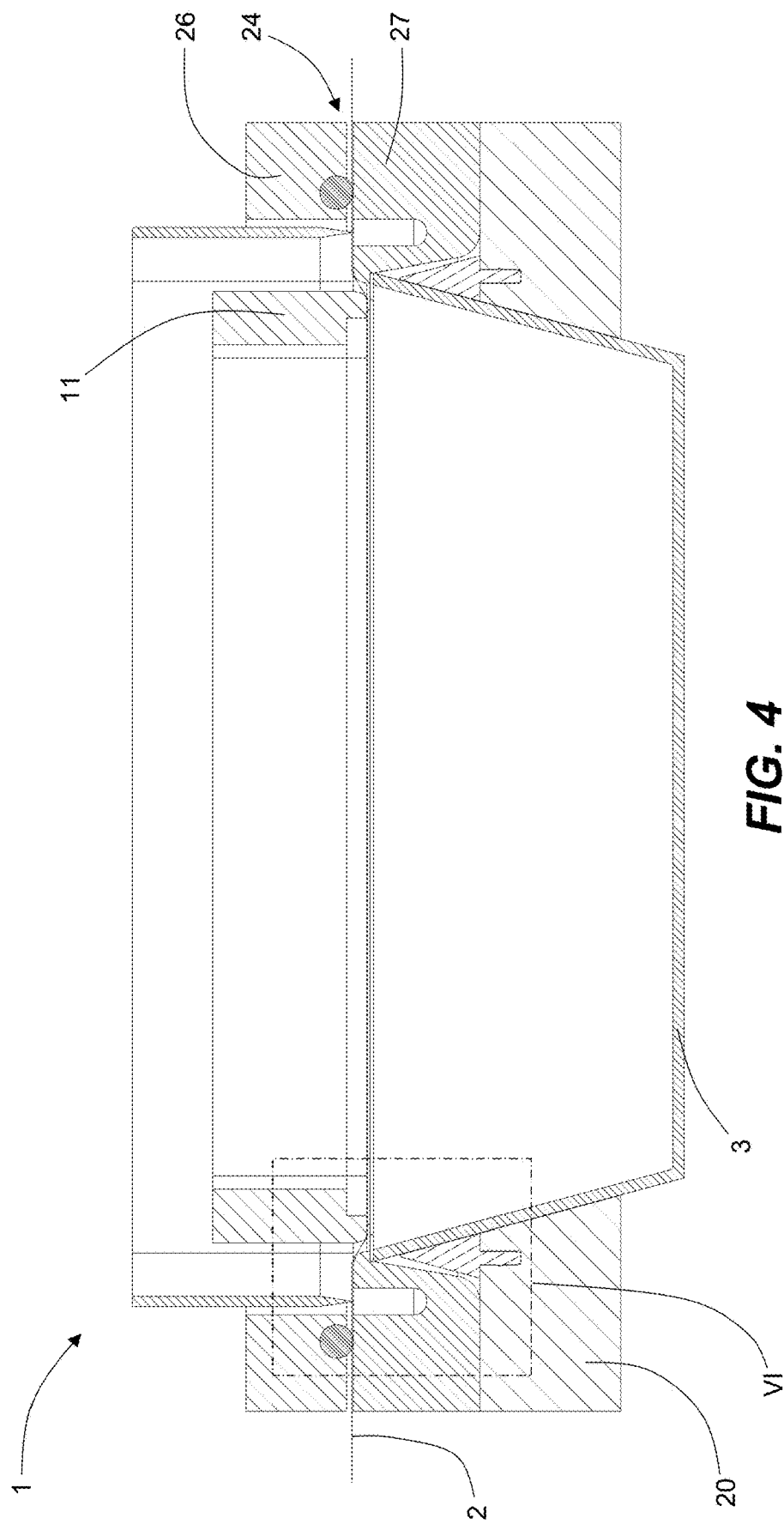
FIG. 4 shows, in a side view, the apparatus of FIG. 3 with the supporting element and the closing element in a further intermediate position between the home position and a working position, with the retaining device in the operating configuration and with the cutting means in an intermediate position between the retracted position and an extracted position.
Figure 5:
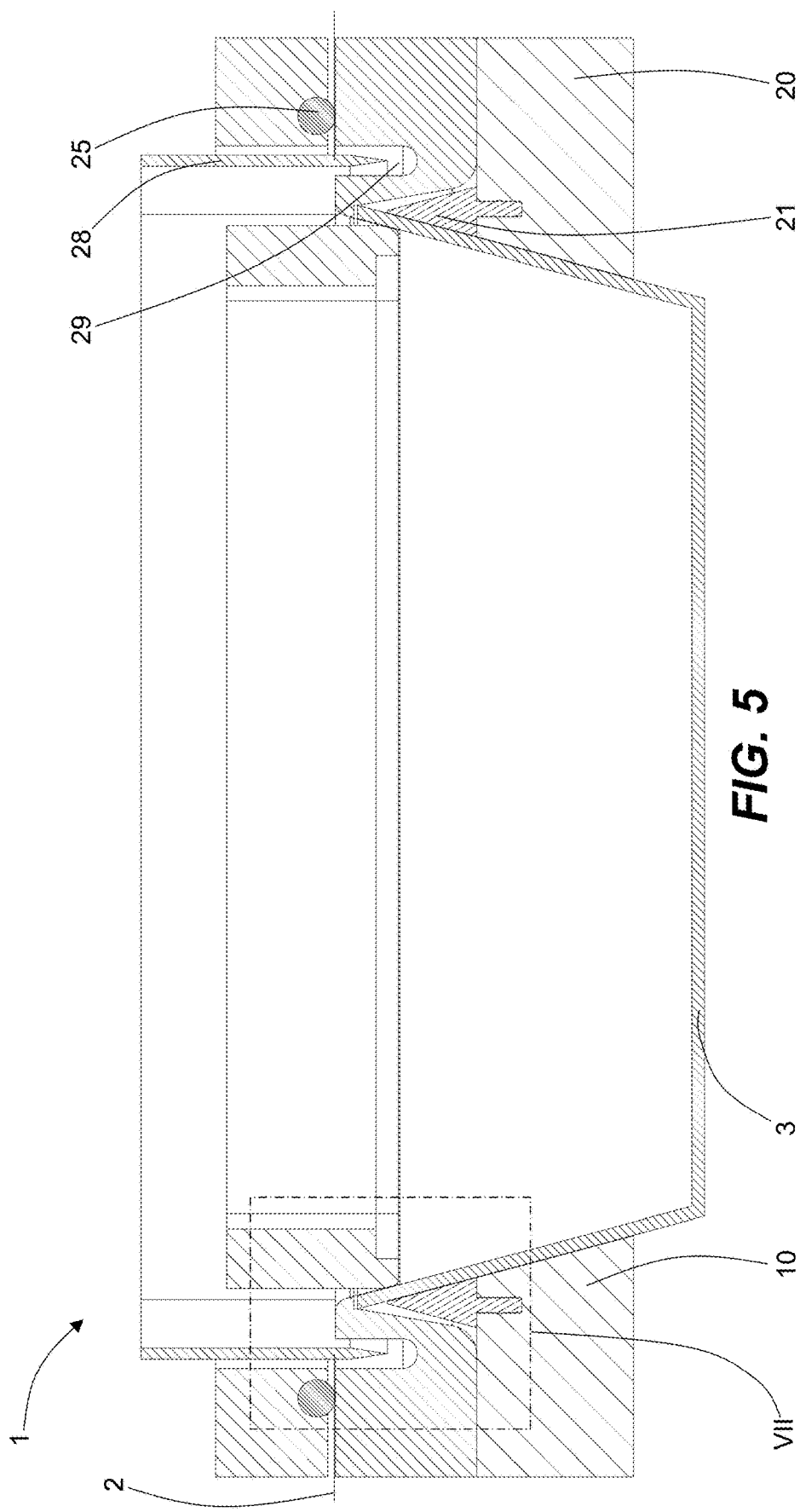
FIG. 5 shows, in a side view, the apparatus of FIG. 4 with the supporting element and the closing element in the working position, with the retaining device in the operating configuration and with the cutting means in the extracted position.
Figure 7:
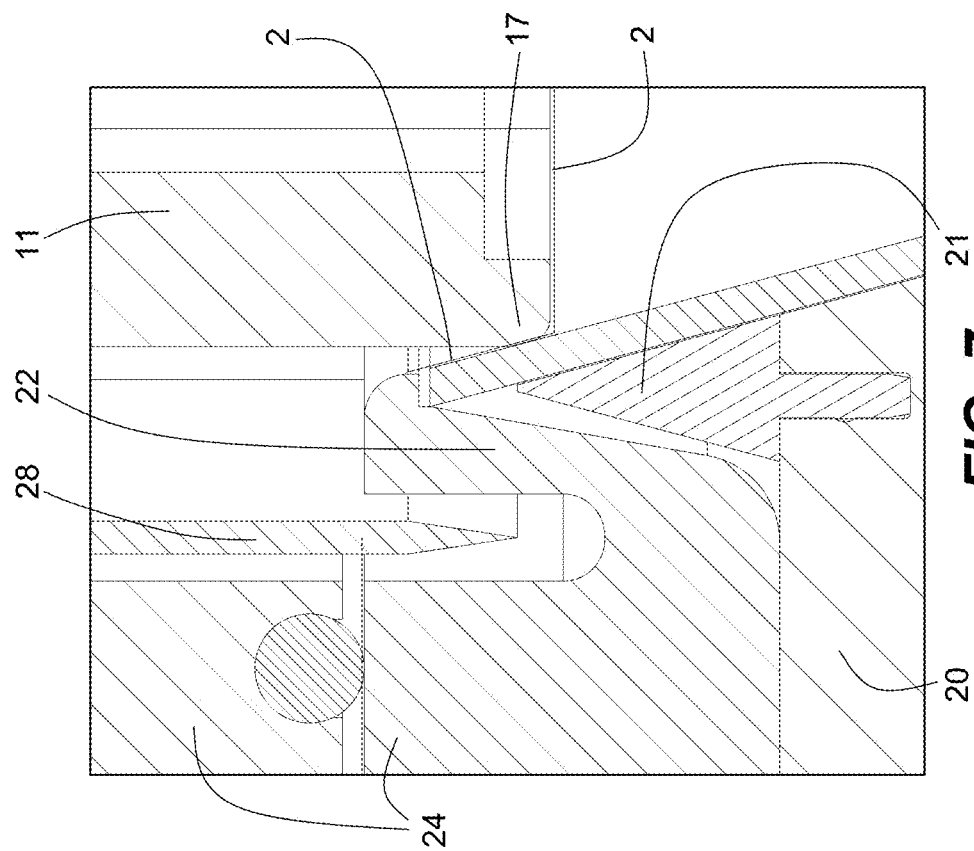
Figure 6:
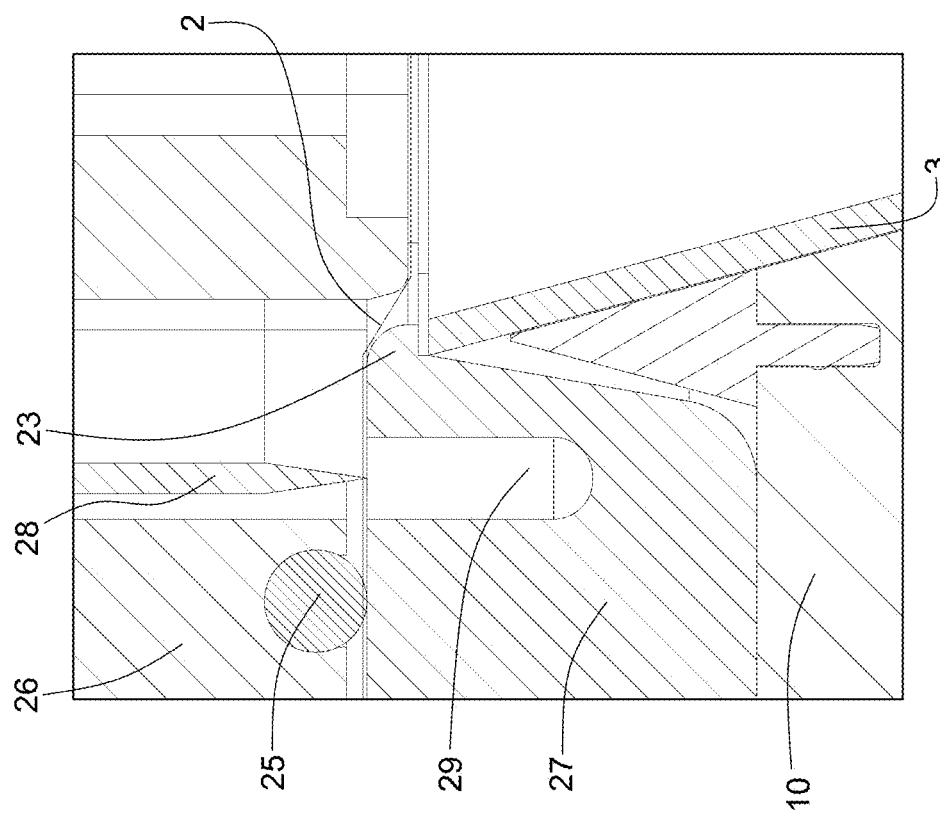
Figure 8:
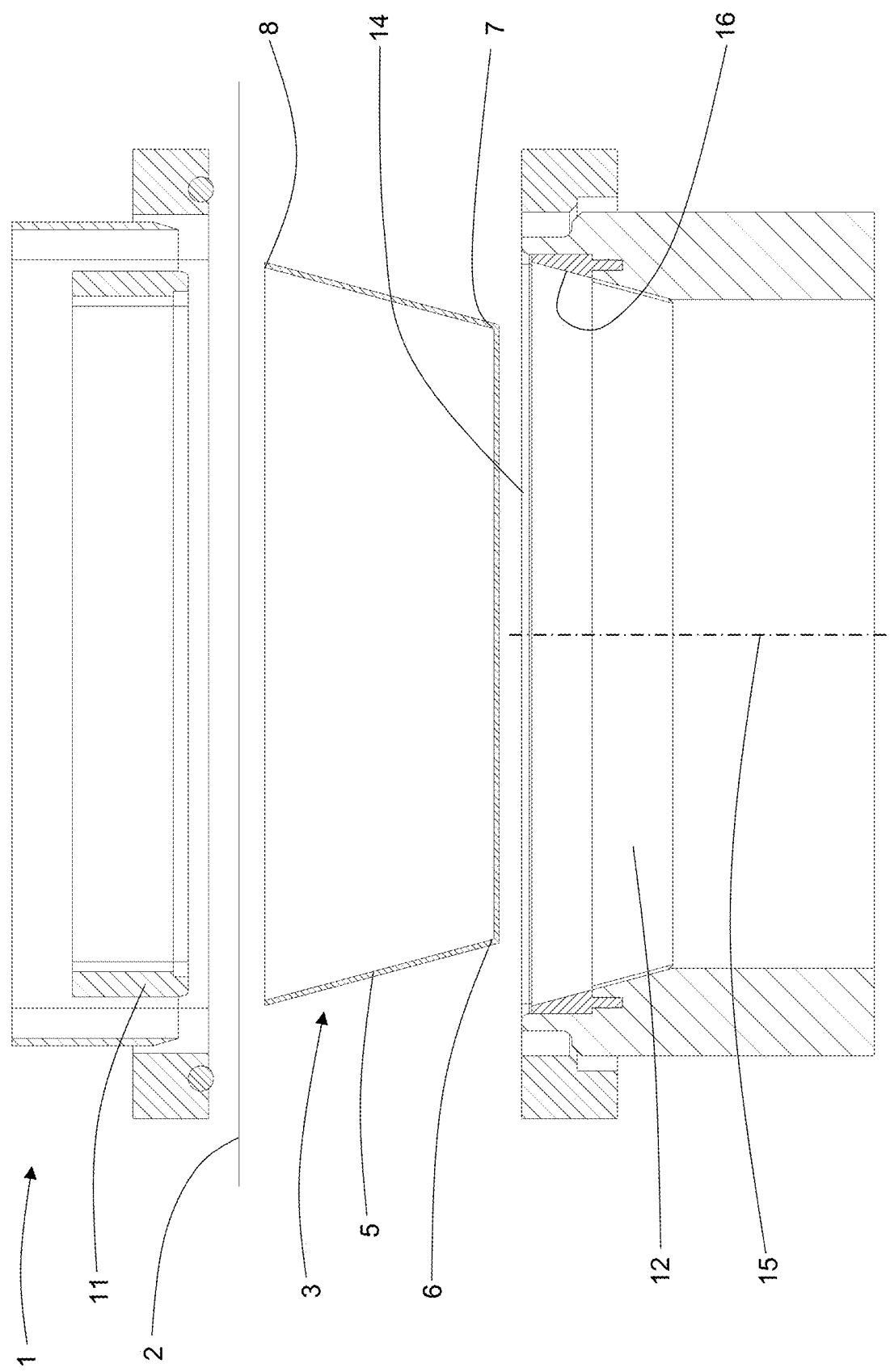
Figure 9:
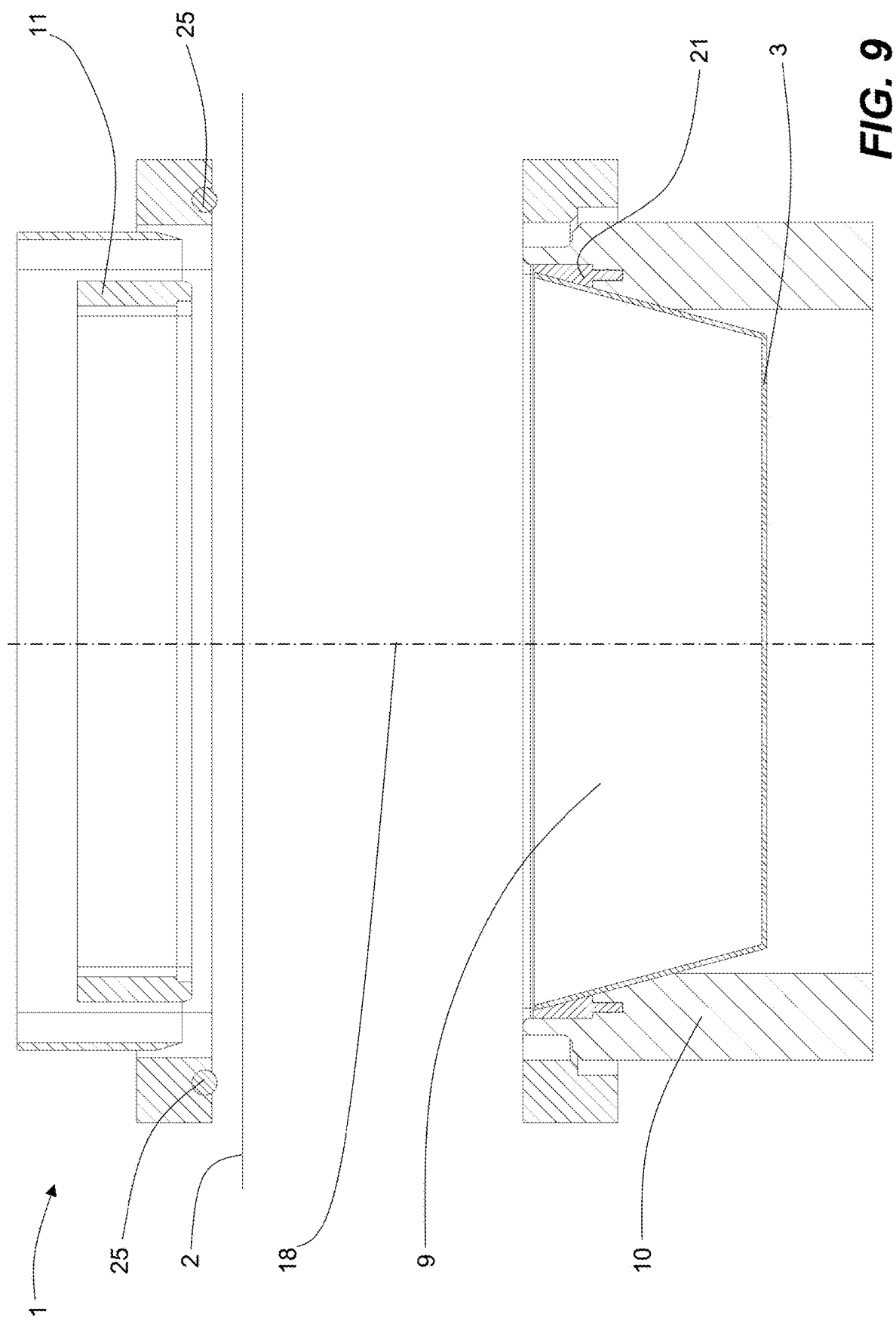
Figure 10:
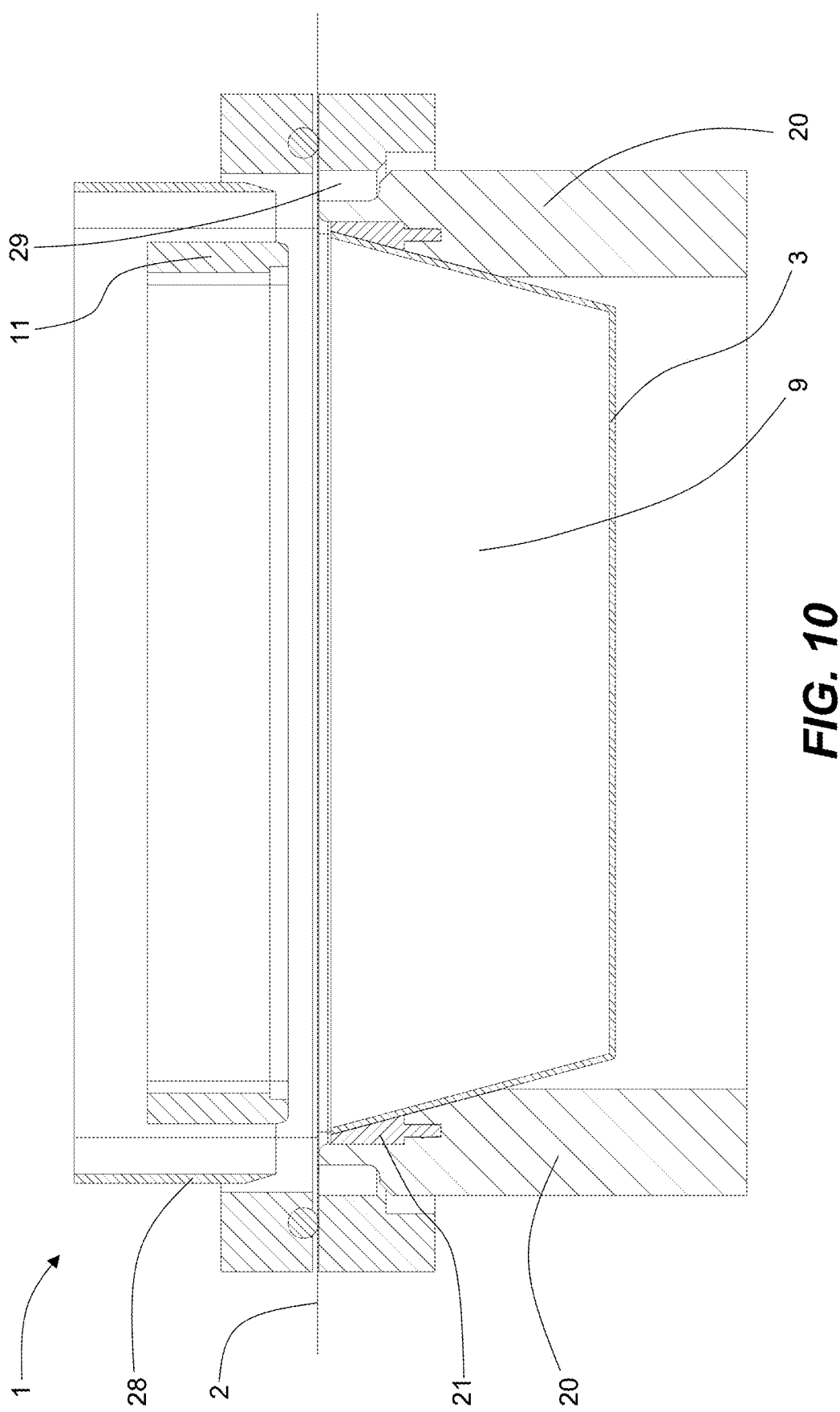
Figure 11:
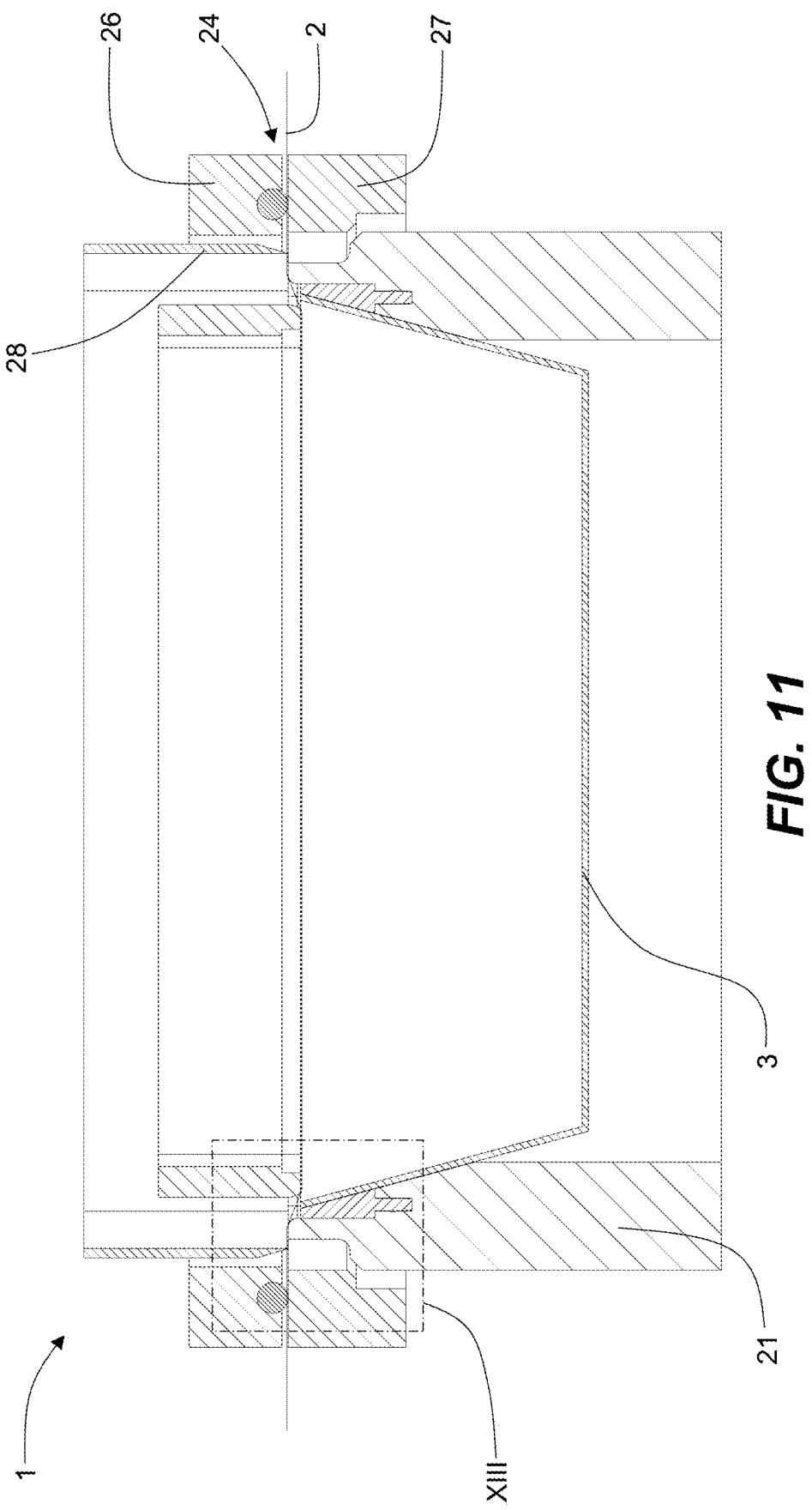
Figure 12:
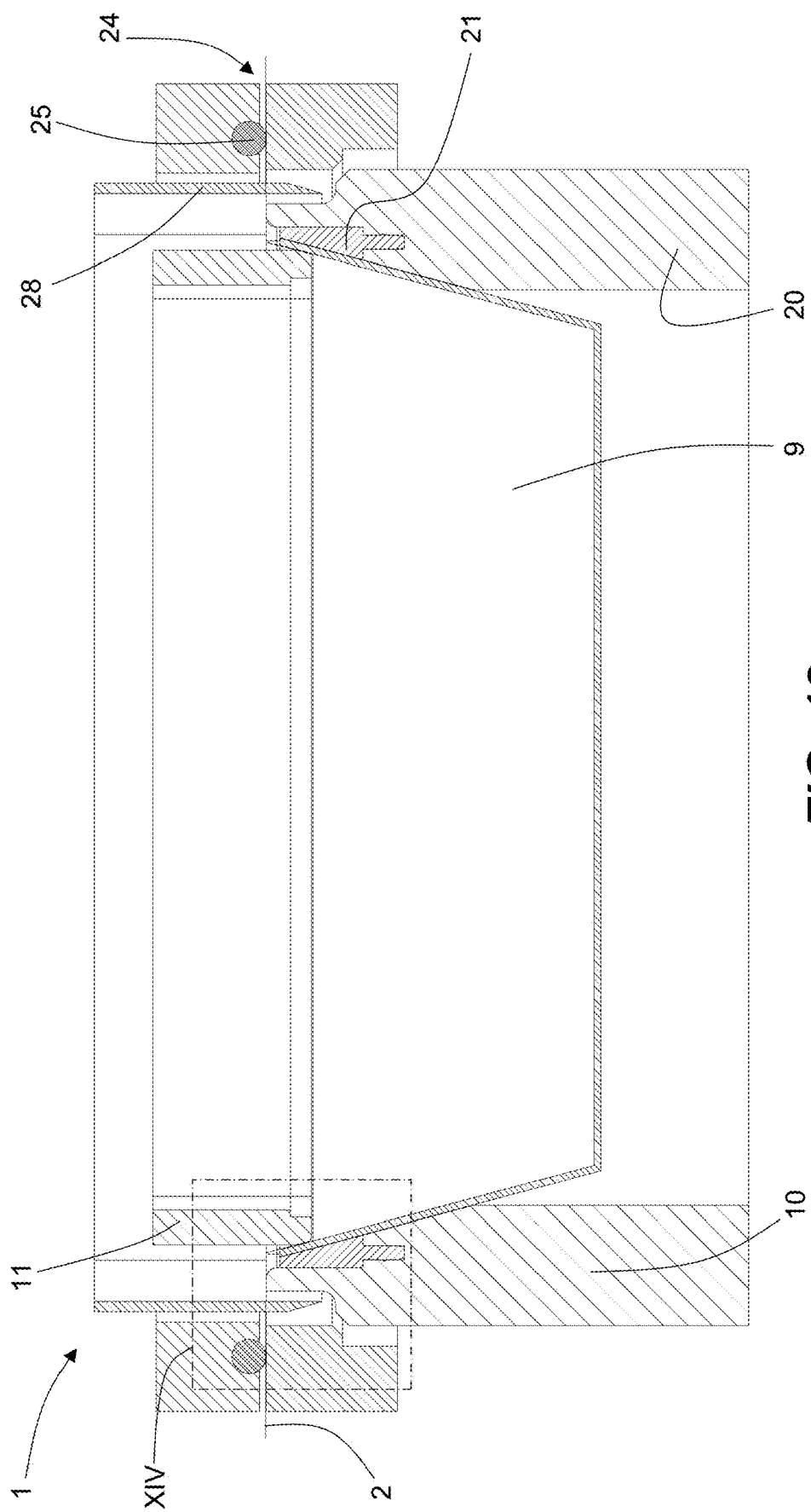

FIG. 6 is an enlarged view of the detail VI of FIG. 4;
FIG. 7 is an enlarged view of the detail VII of FIG. 5;
FIG. 8 shows, in a side view, a second embodiment of an apparatus according to this invention, with the supporting element and the closing element in the home position, sectioned according to a vertical section plane;

FIG. 9 shows, in a side view, the apparatus of FIG. 8 with the support inserted into the seat;

FIG. 10 shows, in a side view, the apparatus of FIG. 9 with the supporting element and the closing element in the intermediate position between the home position and the working position, with the retaining device in the operating configuration and with the cutting means in the retracted position;

FIG. 11 shows, in a side view, the apparatus of FIG. 10 with the supporting element and the closing element in the further intermediate position between the home position and the working position, with the retaining device in the operating configuration and with the cutting means in the intermediate position between the retracted position and the extracted position;

FIG. 12 shows, in a side view, the apparatus of FIG. 11 with the supporting element and the closing element in the working position, with the retaining device in the operating configuration and with the cutting means in the extracted position;

FIG. 13 is an enlarged view of the detail XIII of FIG. 11;

FIG. 14 is an enlarged view of the detail XIV of FIG. 12; and

Figure 15:
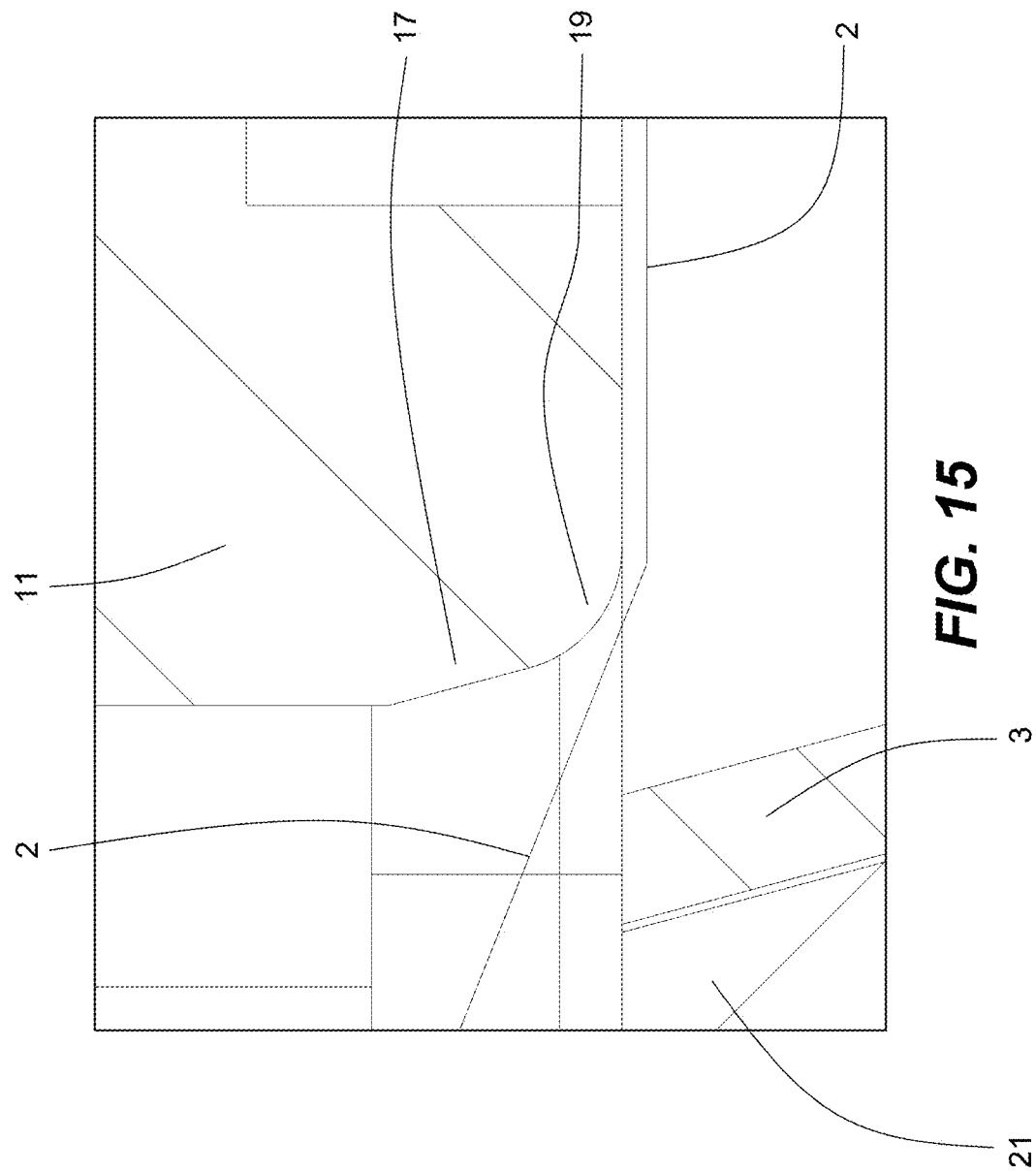

FIG. 15 is an enlarged view of the detail XV of FIG. 13.

With reference to the above-mentioned figures, the reference number 1 denotes in its entirety an apparatus for applying a lid to a support containing a product according to this invention. In all of the appended figures, in order to improve understanding of them, the product inside the support has not been illustrated.

In the context of this invention the term "lid" is used to indicate both lids made with closing film (whether they are single-layer or multi-layer and/or materials that are plastic-, paper-, cardboard-, aluminium-based, etc.), and lids constituted of shaped elements, whether they are flexible, rigid or semi-rigid, such as thermoformed or moulded lids; in these cases too it will be possible to use any material suitable for the purpose, whether single-layer, or multi-layer.

Moreover, the lid 2 will also be able to constitute one piece with the support 3.

In the embodiments illustrated in the accompanying figures only the case in which the lid 2 is constituted of a film is shown.

Hereinafter is a description initially of the apparatus 1 for applying a lid 2 to a support 3 containing a product according to this invention. That is followed by a description, first of the method, then of the related pack. What will be described with reference to the apparatus 1 and with reference to the method, shall be understood to also apply, respectively, even with reference to the method and with reference to apparatus 1, if technically compatible.

The apparatus 1 according to this invention is an apparatus 1 for applying a lid 2 to a support 3 containing a product, the support 3 comprising a bottom wall 4 and one or more lateral walls 5. The lateral walls 5 extend upwards starting from a perimetric edge 6 of the bottom wall 4 and each lateral wall 5 extends from a lower edge 7, which is connected to the perimetric edge 6, to an upper edge 8, which is opposite to the lower edge 7.

Although the apparatus 1 is advantageously applied in the case in which the support 3 comprises a plurality of lateral walls 5 (for example separated by edges as shown in the accompanying figures), it is in any case possible for it to also be applied in the case in which the support 3 comprises a single continuous lateral wall 5. In the former case, in which the support 3 comprises multiple lateral walls 5, it is for example possible that the support 3 comprises four lateral walls 5 with the lateral walls 5 opposite each other in pairs. In the latter case, in contrast, in which the support 3 comprises a single lateral wall 5, it is for example possible that the support 3 defines a substantially inverted frustoconical overall shape, with the lateral wall 5 extending as a continuous ring above the perimetric edge 6 of the bottom wall 4. In any case, this invention may also be applied in the case in which the support 3 is different from the two possible examples described above. It should be emphasised that, for ease of description, hereinafter reference will mainly be made to the case in which the support 3 comprises a plurality of lateral walls 5, without thereby excluding the case in which the support 3 comprises a single continuous lateral wall 5.

Preferably, lateral walls 5 are provided along the entire perimetric edge 6 of the bottom wall 4. Moreover, the lateral walls 5 are advantageously constrained to each other in such a way that together they define a single continuous structure. In some cases, between the lateral walls 5 there are no holes or free spaces, in contrast in other cases they are present.

In general, the support 3 may be made of any material. In some cases, the support 3 is constituted of materials comprising, in general, cellulose. For example, the support 3 may be constituted of a paper and cardboard industry article, that is to say, a cellulose material-based article (such as paper, cardboard or paperboard). In other embodiments, the support 3 may be constituted of different materials, for example a plastic material-based article or a metal material-based article (such as aluminium). It is also possible for the support 3 to be constituted of an article based on multiple different materials (such as, for example, both cellulose material and plastic material). These same possibilities regarding the materials usable also apply for the lid 2.

It should be emphasised that the support 3 may be constituted of a single sheet folded and/or shaped and/or glued on itself, or of two or more sheets folded and/or shaped and/or glued or constrained to each other. It is therefore possible either for the support 3 to have a single layer, or for the support 3 to have a plurality of layers (which may be made of the same material or of materials which are different from each other).

Moreover, this invention is not limited even by the type of support 3, since it may be transparent, coloured, printed, with text, with windows made in the lateral walls 5 or in the bottom wall 4, etc. Moreover, the support may have a single compartment or multiple compartments, in the latter case, moreover, it is possible for the lid 2 to cover all of the compartments simultaneously or for there to be multiple lids 2 each applied to one or more compartments. In the latter case, the lateral walls 5 referred to below regarding fixing of the lid 2 will be those which perimetrically delimit the one or more compartments affected by the lid 2.

The bottom wall 4 and the lateral walls 5 of the support 3 together define a housing 9 into which the product is inserted. Advantageously, the product is a food product and in particular a product belonging to the produce category. However, it is possible that the product is a product of a different type, for example a stationery article.

Preferably, the lateral walls 5 of the support 3 are without a flange connected to the upper edge 8. In other words, the upper edge 8 of the lateral walls 5 is a free edge.

The upper edge 8 also corresponds to the portion of the lateral walls 5 placed at the height furthest from the bottom part 4.

The lateral walls 5 are advantageously flared and each of them defines an angle of inclination, relative to the bottom wall 4 and measured inside the housing 9, which is preferably greater than a right angle.

The apparatus 1 according to this invention comprises a supporting element 10 and a closing element 11.

The supporting element 10 defines a seat 12, which is intended, in use, for receiving the support 3, and has at least one contact portion 13, as described in more detail below.

The seat 12 is advantageously open at the top at an upper opening 14 for allowing insertion of the support 3 into the seat 12 and/or removal of the pack from the seat 12, and it preferably has an exiting central axis 15 which is defined as the axis which comes out of the seat 12 through the upper opening 14 and which is substantially centred relative to the lateral surfaces 16 of the seat 12.

In fact, the seat 12 has one or more lateral surfaces 16, for supporting the lateral walls 5 of the support 3. The lateral surfaces 16 also define the contact portion 13. Advantageously the lateral surfaces 16 of the seat 12 have a flared trend similar to that of the lateral walls 5 which they must support (for example frustopyramidal or frustoconical) at least at the contact portion 13, preferably over their entire extent.

In some cases, the seat 12 is substantially shaped similarly to the support 3 to be housed. In this case, the seat 12 is delimited both by the lateral surfaces 16, which are configured to make contact with the lateral walls 5 of the support 3, and by a base surface, which is configured to make contact with the bottom wall 4 of the support 3. In contrast, in other cases, as is clearly shown even in the accompanying figures, the seat 12 only has the lateral surfaces 16, whilst it is without the base surface. In particular, in the accompanying figures it is possible to see how the seat 12 only has lateral surfaces 16 which are configured to make contact with part of the lateral walls 5 and how, preferably, they are shaped in a similar way to the lateral walls 5 with which they must come into contact.

The closing element 11, is operatively associated with the supporting element 10, is configured to apply the lid 2 to the support 3 and has at least one fixing portion 17.

Figure 2:
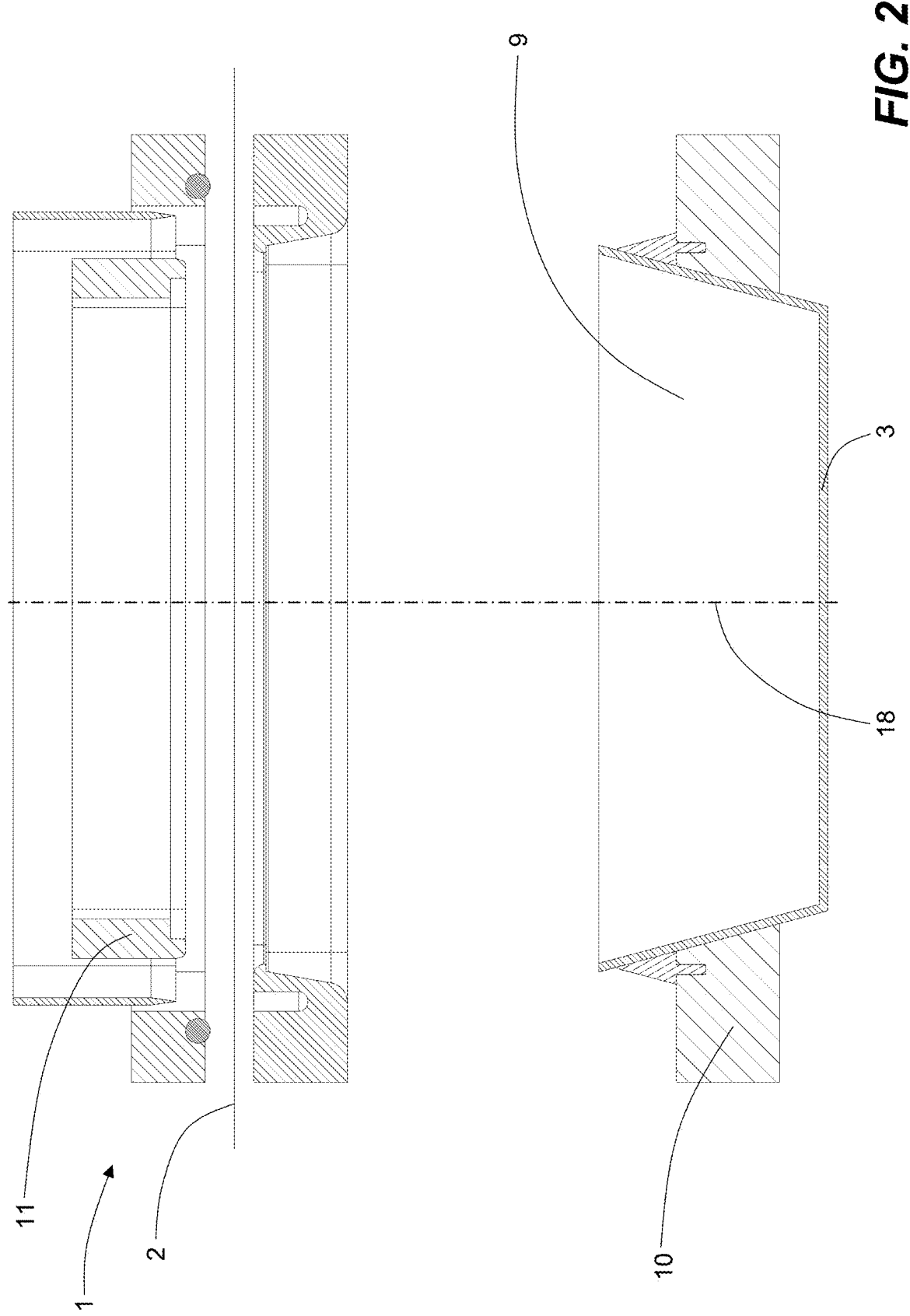
FIG. 2 shows, in a side view, the apparatus of FIG. 1 with a support inserted into a seat defined by the supporting element.

The supporting element 10 and the closing element 11 are movable relative to each other: at least one of either the supporting element 10 or the closing element 11 is in fact movable relative to the other, along a movement trajectory 18, between a home position and a working position. When the supporting element 10 and the closing element 11 are in the home position, the supporting element 10 and the closing element 11 are spaced apart and uncoupled from each other (as shown in FIG. 2—first embodiment—and in FIG. 9—second embodiment) to allow access to the seat 12 through the upper opening 14, for inserting the support 3 into the seat 12 itself and/or for removing from the seat 12 the pack obtained. In contrast, when the supporting element 10 and the closing element 11 are in the working position, the supporting element 10 and the closing element 11 are coupled to each other (as shown in FIG. 5—first embodiment—and in FIG. 12—second embodiment), the closing element 11 is partly inserted inside the seat 12 and preferably the seat 12 itself is not accessible from the outside for inserting the support 3 into the seat 12 itself and/or for removing from the seat 12 the pack obtained.

In some embodiments, the supporting element 10 is fixed and stationary, relative to an apparatus 1 supporting framework, which is not shown in the accompanying figures and which is advantageously configured to support and hold up the other elements of the apparatus 1, whilst the closing element 11 is movable relative to the supporting element 10. In contrast, in other embodiments, the closing element 11 is fixed and stationary relative to the supporting framework, whilst the supporting element 10 is movable relative to the closing element 11. In yet other embodiments, both the supporting element 10 and the closing element 11 are movable relative to the supporting framework.

Advantageously, the movement trajectory 18 is a line of movement which is straight and, preferably, vertical (as shown in FIGS. 2 and 9), preferably when the lid 2 is an element separate from the support 3. In such embodiments, the closing element 11 is placed above the supporting element 10 and the movement trajectory 18 is parallel to the exiting central axis 15. In any case, other embodiments are possible, in which the movement occurs in a different way, as in the case in which one element rotates relative to the other (for example, in embodiments in which the supporting element 10 and the closing element 11 are hinged to each other, these embodiments are particularly advantageous if the lid 2 constitutes one piece with the support 3 and its positioning inside the seat 12 must be obtained by folding/rotation). In accordance with one innovative aspect of this invention, when the supporting element 10 and the closing element 11 are in the working position, the fixing portion 17 is inserted inside the seat 12. Moreover, the fixing portion 17 (which is part of the closing element 11) and the contact portion 13 (which is part of the supporting element 10) are coupled to each other for clamping between them, in use, both a part of the lid 2, and a part of at least one of the lateral walls 5.

According to this invention, the fixing portion 17 is configured to fix to each other the part of the lid 2 and the part of the at least one lateral wall 5 which are clamped between the fixing portion 17 itself and the contact portion 13. Advantageously, the part of the lateral wall 5, which is interposed between the contact portion 13 and the fixing portion 17 when the supporting element 10 and the closing element 11 are in the working position (on which the lid 2 is fixed), is located between the lower edge 7 and the upper edge 8, preferably nearer to the upper edge 8 than to the lower edge 7 but spaced apart from the upper edge 8.

In some embodiments, the closing element 11 is configured to fix the lid 2 on all of the lateral walls 5 of the support 3 (with or without interruption). In these embodiments advantageously the supporting element 10 defines a single contact portion 13 and the closing element 11 defines a single fixing portion 17. In particular, the supporting element 10 comprises a contact frame which defines the entire contact portion 13, and the closing element 11 comprises a fixing frame which defines the fixing portion 17. Advantageously, both the contact frame and the fixing frame extend without interruption around the exiting central axis 15 and are coupled to each other when the supporting element 10 and the closing element 11 are in the working position. In some embodiments, the contact frame delimits the seat 12 at the top and surrounds and defines the upper opening 14 of the seat 12.

However, in order for this invention to be applied it is not necessary for the closing element 11 to be configured to fix the lid 2 on all of the lateral walls 5 of the support 3, with or without interruption. In fact, this invention is advantageously applied in the case of packaging in which a fluid-tight seal is not necessary between the packaged product and the outside environment. It is therefore possible that the closing element 11 is configured to fix the lid 2 only to some of the lateral walls 5 of the support 3, or to fix the lid 2 only on some zones, spaced apart from each other, of the lateral walls 5. For example, in some embodiments the supporting element 10 defines a plurality of contact portions 13 and the closing element 11 defines a plurality of fixing portions 17. Each contact portion 13 is associated with a respective fixing portion 17 and, when the supporting element 10 and the closing element 11 are in the working position, each fixing portion 17 is coupled to the respective contact portion 13 for clamping a respective part of the lid 2 and a respective part of a lateral wall 5 and the fixing portion 17 is configured to fix the respective part of the lid 2 on the respective part of the lateral wall 5.

It should be emphasised that this invention was initially developed relating to welding of the lid 2 on the support 3. In this case, the closing element 11 is substantially a welding head, which is configured to weld the lid 2 to the lateral walls 5 of the support 3, and the fixing portion 17 is substantially the welding portion of the welding head. In such embodiments, the apparatus 1 advantageously comprises heating means which are operatively associated with the closing element 11 (welding head) and, more specifically, with the fixing portion 17 (welding portion) for heating it in such a way as to advantageously allow fixing (welding) of the lid 2 to the support 3, in accordance with what was described above. The features and the aspects strictly linked to the heating means are known to a person expert in the sector and for this reason will not be described in detail below.

However, this invention shall not be considered limited to fixing the lid 2 on the support 3 by means of the welding head, instead it may also be applied in different cases such as, for example, in the case in which the lid 2 is glued to the lateral walls 5 of the support 3. For example, it is possible that before insertion of the support 3 into the seat 12 of the supporting element 10 a heat-activated glue is applied on the lateral walls 5 and that the closing element 11 applies the lid 2 activating the glue and fixing it at the zones of the lateral walls 5 on which the glue was positioned.

Advantageously, as shown for example in the accompanying figures, the fixing portion 17 superficially extends parallel to the surface of the contact portion 13 at least when the supporting element 10 and the closing element 11 are in the working position. Moreover, preferably, the closing element 11 has a first contact portion 19 adjacent to the fixing portion 17 and below it (that is to say, placed on the seat 12 side). The first contact portion 19 is advantageously rounded and is shaped in such a way as to curve inwards towards the exiting central axis 15 moving away from the fixing portion 17 (in particular in such a way that it curves inwards more relative to the lateral surfaces 16). That is clearly visible in the detail shown in FIG. 15. If the lid 2 is constituted of a closing film, the first contact portion 19 is therefore positioned in such a way as to be the first to make contact with the lid 2, and, without the presence of sharp edges, makes it possible to prevent the closing film from being ruined or tearing during the movement of the at least one of either the supporting element 10 or the closing element 11 from the home position towards the working position.

In accordance with a further innovative aspect of this invention, and as is clearly visible in the accompanying figures, the supporting element 10 in turn comprises a main body 20 and at least one elastically deformable body 21, with the elastically deformable body 21 mounted on the main body 20, advantageously removably, and defining the contact portion 13. In this embodiment, the lateral surfaces 16 of the seat 12 are partly defined by the elastically deformable body 21 (in particular, the parts of the lateral surfaces 16 nearest the upper opening 14 may advantageously be defined by the elastically deformable body 21) and partly by the main body 20 (in particular, the parts of the lateral surfaces 16 furthest from the upper opening 14 may advantageously be defined by the main body 20). Making it using the elastically deformable body 21 allows the contact portion 13 to adapt to the fixing portion 17 compensating for any backlash, and allows improved fixing of the lid 2 to the support 3.

In some embodiments, the supporting element 10 comprises a single elastically deformable body 21, which advantageously defines the entire contact frame. In other embodiments, in contrast, the supporting element 10 comprises a plurality of elastically deformable bodies 21, each of which defines a respective contact portion 13.

Figure 1:
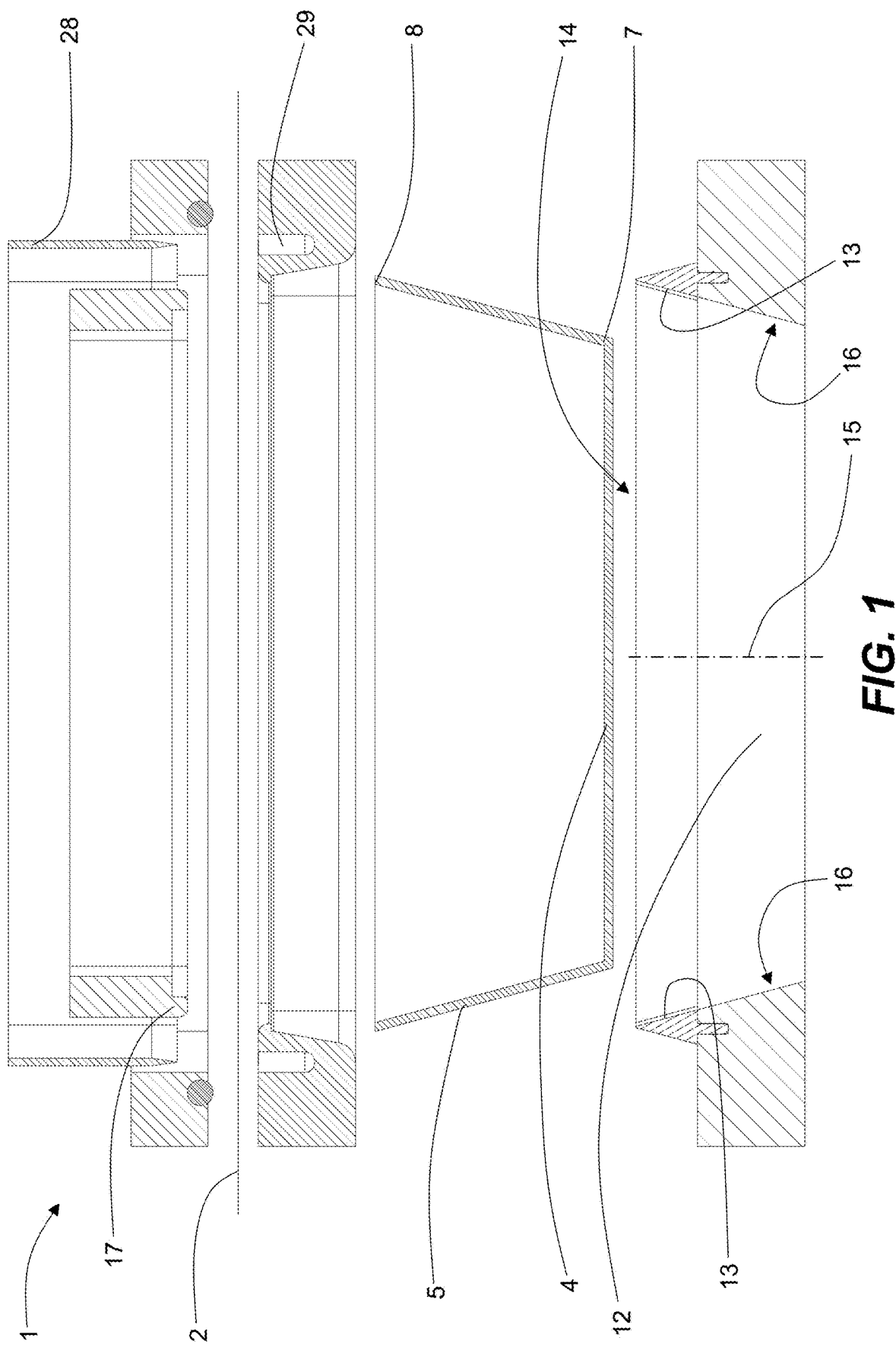
FIG. 1 shows, in a side view, a first embodiment of an apparatus according to this invention, with a supporting element and a closing element in a home position, sectioned according to a vertical section plane.

In accordance with a further innovative aspect of this invention, in some embodiments (such as, for example, in the first embodiment shown in FIGS. 1 to 7) the apparatus 1 also comprises a blocking element 22 which is switchable between an inactive configuration and an active configuration. When the blocking element 22 is in the inactive configuration, the blocking element 22 is disassociated from the supporting element 10 (FIG. 1). In contrast, when the blocking element 22 is in the active configuration, the blocking element 22 is associated with the supporting element 10 and defines an undercut relative to a line of extraction of the support 3 from the seat 12 (FIG. 5). Advantageously, the line of extraction is parallel to the movement trajectory 18 and is preferably positioned vertically in use. In these embodiments, the blocking element 22 is kept in the active configuration during the movement of the supporting element 10 and/or of the closing element 11 from the working position towards the home position. In fact, the presence of the blocking element 22 prevents the pack obtained from coming out of the seat 12 if the lid 2 remains attached to the fixing portion 17 (a problem which could easily occur if the apparatus 1 comprises the welding head).

Advantageously, the switching between the inactive configuration and the active configuration of the blocking element 22 occurs by means of a movement of the blocking element 22 along a blocking line which is parallel to the movement trajectory 18, as can be seen in the appended figures. In other embodiments, in contrast, the switching between the inactive configuration and the active configuration may occur by means of the movement of the blocking element 22 along a different line such as, for example, along a line perpendicular to the movement trajectory 18 or by means of a rotation of the blocking element 22 (for example it is possible that the blocking element 22 comprises an actuator which causes the variation of the configuration between the inactive configuration and the active configuration by means of a rotation).

In the preferred embodiments in which the apparatus 1 comprises the blocking element 22, the same blocking element 22 comprises at least one hooking tooth 23 which defines the undercut. Moreover, the hooking tooth 23 is advantageously configured to make contact with the upper edge 8 of the lateral wall 5 during the movement of at least one of either the supporting element 10 or the closing element 11 from the working position towards the home position, when the blocking element 22 is in the active position.

Advantageously, the blocking element 22 defines a plurality of hooking teeth 23. In some embodiments the blocking element 22 comprises a number of hooking teeth 23 which is equal to the number of the lateral surfaces 16 of the seat 12 and each hooking tooth 23 is preferably configured to make contact with the entire upper edge 8 of a respective lateral wall 5. However, embodiments are possible in which the blocking element 22 comprises a lower number of hooking teeth 23 or embodiments in which the blocking element 22 comprises a higher number of hooking teeth 23.

Figure 3:
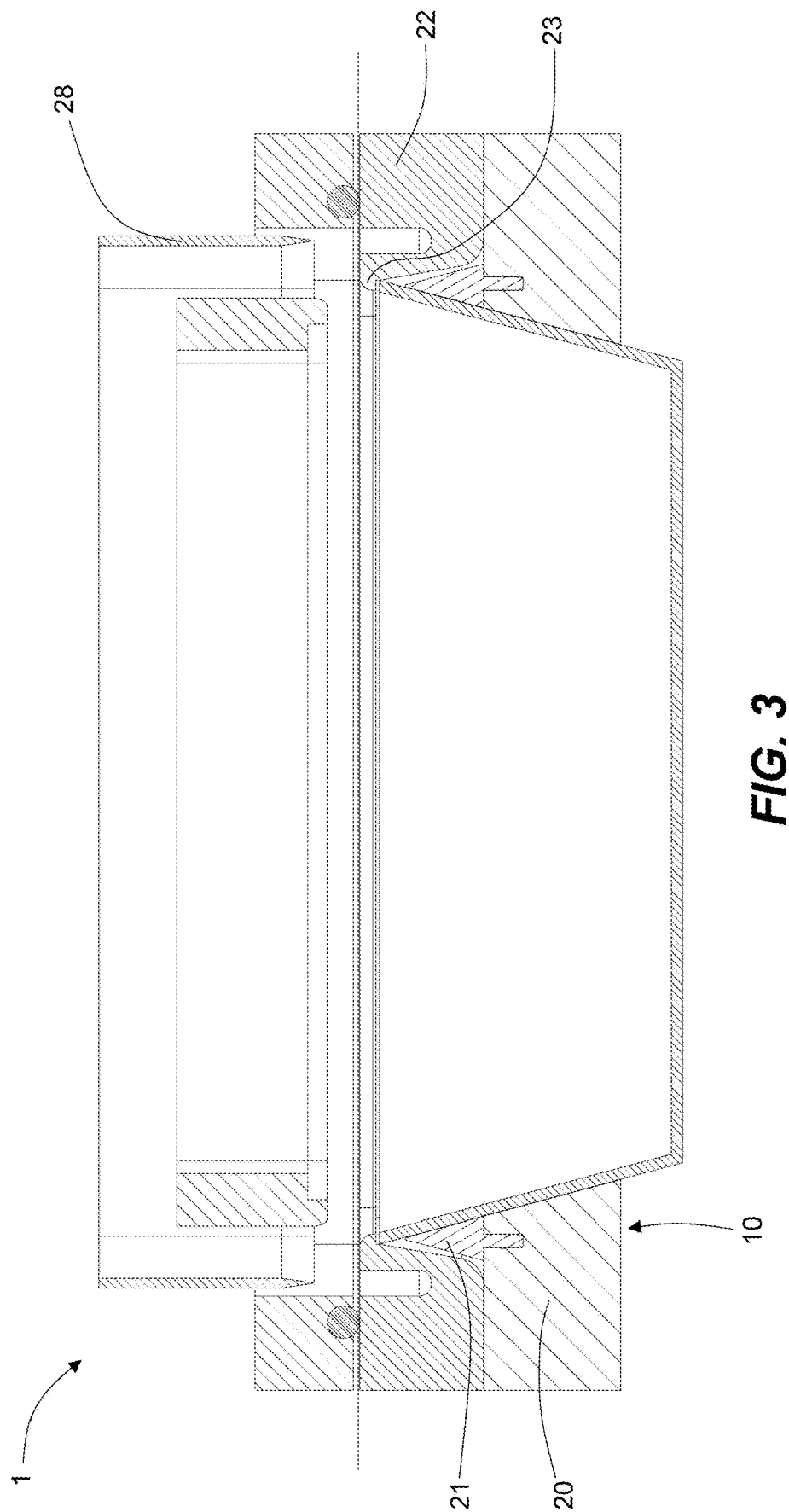
FIG. 3 shows, in a side view, the apparatus of FIG. 2 with the supporting element and the closing element in an intermediate position between the home position and a working position, with a retaining device in an operating configuration and with cutting means in a retracted position.

Moreover, the apparatus 1 advantageously comprises a retaining device 24 which is switchable between a non-operating configuration and an operating configuration. In the non-operating configuration the retaining device 24 is uncoupled from the lid 2 (as shown in FIGS. 1 and 2—first embodiment—and in FIGS. 8 and 9—second embodiment). In the operating configuration, in contrast, the retaining device 24 retains the lid 2 and keeps it interposed between the supporting element 10 and the closing element 11 (as shown in FIGS. 3 to 5—first embodiment—and in FIGS. 10 to 12—second embodiment). Moreover, the retaining device 24 may be kept in the operating configuration during the movement of the at least one of either the supporting element 10 or the closing element 11 from the home position towards the working position.

If the lid 2 is constituted of a closing film, advantageously, the retaining device 24 comprises an upper retaining element 26 and a lower retaining element 27 which are movable at least one relative to the other between a non-operating position and an operating position. When the upper retaining element 26 and the lower retaining element 27 are in the non-operating position, which corresponds to the non-operating configuration of the retaining device 24, they are spaced apart and uncoupled from each other. In contrast, when the upper retaining element 26 and the lower retaining element 27 are in the operating position, which corresponds to the operating configuration of the of the retaining device 24, they are near and coupled to each other for retaining the lid 2.

In some embodiments, the lower retaining element 27 also defines the blocking element 22 (such as, for example, in the first embodiment). In contrast, in other embodiments, the lower retaining element 27 is part of the supporting element 10 (such as, for example, in the second embodiment). Preferably, the retaining device 24 comprises sealing gaskets 25 which are configured to make contact with the lid 2 when the retaining device 24 is in the operating configuration, and to apply a friction force to allow improved retaining of the lid 2. The sealing gaskets 25 are advantageously fixed to the upper retaining element 26 and/or to the lower retaining element 27.

In some embodiments in which the lid 2 is constituted of a closing film, the apparatus 1 also comprises cutting means 28 which are advantageously configured to cut the lid 2 from a continuous web or from a larger sheet of the same film, which is retained above the seat 12 by the retaining device 24. The cutting means 28 are advantageously movable between a retracted position (FIG. 3—first embodiment—and FIGS. 10—second embodiment) and an extracted position (FIG. 5—first embodiment—and FIG. 12—second embodiment), with the movement from the retracted position to the extracted position causing cutting of the lid 2. Advantageously, the cutting means 28 are movable from the retracted position to the extracted position during the movement of the at least one of either the supporting element 10 or the closing element 11 from the home position to the working position. In particular, cutting of the lid 2 is preferably performed when the at least one of either the supporting element 10 or the closing element 11 is near to reaching the working position.

In the preferred embodiments, such as those shown in the appended figures, the cutting means 28 are fixed to the closing element 11 during the movement of at least one of either the supporting element 10 or the closing element 11 from the home position to the working position.

Advantageously, the retaining device 24 has recesses 29 inside which the cutting means 28 are inserted when they are in the extracted position.

There now follows a description of the method for applying the lid 2 to the support 3 containing the product. It should be emphasised that the support 3 is a support of the type previously described.

Firstly, the method comprises a positioning step, in which the lid 2 is positioned above the support 3. Secondly, the method comprises an inserting step, which is carried out after the positioning step, in which the lid 2 is inserted inside the support 3. In the apparatus 1 according to this invention, the inserting step is carried out using the closing element 11 and by means of the movement of at least one of either the supporting element 10 or the closing element 11 from the home position to the working position.

If, before the positioning step, the lid 2 is already connected to the support 3 at a folding zone (for example since it is constituted of a flap of a same material which also contributes to constituting the support 3), during the positioning step the lid 2 is folded relative to the support 3 at the folding zone. Finally, the method comprises an applying step, which is carried out after the inserting step, in which the lid 2 is applied to the support 3. During the applying step the lid 2 is applied to the support 3 only at one or more lateral walls 5 and inside the housing 9 (that is to say, it is applied to the surface of the lateral walls 5 which is directed towards the inside of the housing 9). Preferably, during the applying step the lid 2 is applied to the support 3 at a part of said one or more lateral walls 5, which is inclined outwards moving away from the bottom wall 4. In the apparatus 1 according to this invention, the applying step is advantageously carried out using the fixing portion 17 and the contact portion 13 and by fixing a perimetric part of the lid 2 on the parts of the one or more lateral walls 5, which are clamped between the fixing portion 17 and the contact portion 13.

In some embodiments in which the lid 2 is constituted of a closing film, the method also comprises a retaining step and a cutting step. In the retaining step a web or a sheet of the film of interest is retained above the support 3, whilst in the cutting step, which is carried out during the inserting step, the web or the sheet is cut in order to obtain the lid 2. Preferably, the inserting step is carried out during the retaining step. In the apparatus 1 according to this invention, the retaining step is preferably carried out by the retaining device 24 in the operating configuration (advantageously with the upper retaining element 26 and the lower retaining element 27 in the operating position), whilst the cutting step is preferably carried out by the cutting means 28 during their movement from the retracted position to the extracted position. Advantageously, if the applying step is carried out using the closing element 11, the method also comprises both an opening step, and a support 3 blocking step. Preferably in the opening step, which is carried out after the applying step, the closing element 11 is moved away from the support 3, whilst in the support 3 blocking step, which is carried out after the applying step and during the opening step, the support 3 is blocked to prevent the support 3 itself from remaining stuck to the closing element 11, and therefore from being moved together with it. In the apparatus 1 according to this invention, the blocking step is advantageously carried out by the blocking element 22 and, even more advantageously, by its hooking tooth 23.

Finally, the following is a description of the pack to which a further aspect of this invention relates. That pack comprises the support 3, the product placed on the support 3 and the lid 2 which is positioned above the product and which is fixed to the support 3.

The support 3 comprises a bottom wall 4 and one or more lateral walls 5 which extend upwards starting from the perimetric edge 6 of the bottom wall 4. Moreover the bottom wall 4 and the lateral walls 5 together define the housing 9 into which the product is inserted and each lateral wall 5 extends from the lower edge 7, connected to the perimetric edge 6, to the upper edge 8. It should be emphasised that what was previously described with reference to the support 3 advantageously also applies in this case.

The lid 2 is fixed only to the lateral walls 5 of the support 3, in particular only at a zone interposed between the lower edge 7 and the upper edge 8. For example, in the embodiments in which the support 3 comprises a plurality of lateral walls 5, the lid 2 may be fixed either to all of the lateral walls 5 or only to some of the lateral walls 5. Preferably the zone interposed between the lower edge 7 and the upper edge 8, to which the lid 2 is fixed, is spaced apart from the upper edge 8.

Finally, it should be emphasised that in any embodiment of this invention it is possible for holes to be made in the lid 2, or for the lid 2 to have writing, symbols and/or designs on it.

In the preferred embodiments of this invention, as said, the support 3 is without a flange connected to the upper edge 8. It should be emphasised that the term "flange" means any portion of the support 3 which extends outwards from the support 3, starting from the upper edge 8. Moreover, advantageously the lateral walls 5 are flared and each of them defines an angle of inclination, relative to the bottom wall 4 measured inside the housing 9, which is preferably greater than a right angle.

This invention brings important advantages.

Thanks to this invention it was possible to provide an apparatus and a method for applying a lid to a support containing a product, which allows the use of less material than that used by the prior art apparatuses, in particular using supports without flanges.

Furthermore, by using supports without a flange, thanks to this invention it is possible to make trays which occupy less space than the prior art trays provided with a flange, with considerable advantages in terms of dimensions both for the secondary packaging, and for positioning on shelves.

Not least, by giving the lateral walls of the support a flared shape, and positioning a flat lid a predetermined distance from the upper edge, thanks to this invention it is possible to make packs which can be stacked on top of one another in a stable and safe way. In fact, the bottom wall of one pack can rest on the lid of the pack below it, and the upper portion of the lateral walls of the pack below constitutes a retaining element for the lateral walls of the pack placed above it.

Finally, it should be noticed that this invention is relatively easy to produce and that even the cost linked to implementing the invention is not very high. The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for applying a lid (2) to a support (3) containing a product, wherein the support (3) comprises a bottom wall (4) and one or more lateral walls (5) which extend upwards starting from a perimetric edge (6) of the bottom wall (4), the bottom wall (4) and said one or more lateral walls (5) together defining a housing (9) into which the product is inserted and each lateral wall (5) extending from a lower edge (7), connected to the perimetric edge (6), to an upper edge (8);
    said apparatus (1) comprising:
        a supporting element (10), which defines a seat (12) for receiving, in use, the support (3) and which has at least one contact portion (13); and
        a closing element (11), which is operatively associated with the supporting element (10), which is configured to apply in use the lid (2) to the support (3) and which has at least one fixing portion (17);
    wherein:
        the seat (12) is open at the top and has one or more lateral surfaces (16) for supporting in use the one or more lateral walls (5), the one or more lateral surfaces (16) defining said at least one contact portion (13);
        at least one of either the supporting element (10) or the closing element (11) is movable relative to the other, along a movement trajectory (18), between a home position, in which the supporting element (10) and the closing element (11) are uncoupled from each other to allow access to the seat (12), and a working position, in which the supporting element (10) and the closing element (11) are coupled to each other and the closing element (11) is partly inserted into the seat (12);
        the apparatus (1) also comprises a blocking element (22) which is switchable between an inactive configuration, in which it is disassociated from the supporting element (10), and an active configuration, in which it is associated with the supporting element (10) and in which it defines an undercut relative to a line of extraction of the support (3) from the seat (12), the blocking element (22) being kept in the active configuration during the movement of said at least one of either the supporting element (10) or the closing element (11) from the working position towards the home position; and
        the blocking element (22) comprises at least one hooking tooth (23) which defines the undercut, and wherein the hooking tooth (23) is configured to make contact, in use, with the upper edge (8) of at least one of said one or more lateral walls (5) during the movement of said at least one of either the supporting element (10) or the closing element (11) from the working position towards the home position, when the blocking element (22) is in the active position;
    wherein moreover, when the supporting element (10) and the closing element (11) are in the working position:
        the at least one fixing portion (17) is inserted inside the seat (12); and
        the at least one fixing portion (17) and the at least one contact portion (13) are coupled to each other for, in use, clamping between them a part of the lid (2) and a part of at least one of said one or more lateral walls (5) included between the lower edge (7) and the upper edge (8);
    and wherein the at least one fixing portion (17) is configured to fix to each other, in use, the part of the lid (2) and said part of the at least one of the one or more lateral walls (5), which are clamped between the at least one fixing portion (17) and the at least one contact portion (13).

2. The apparatus according to claim 1, wherein the supporting element (10) comprises a main body (20) and at least one elastically deformable body (21) which is mounted on the main body (20) and which defines said at least one contact portion (13).

3. The apparatus according to claim 2, also comprising a retaining device (24) which is switchable between a non-operating configuration, in which in use it is uncoupled from the lid (2), and an operating configuration, in which in use it retains the lid (2) and keeps the lid (2) interposed between the supporting element (10) and the closing element (11), the retaining device (24) being kept in the operating configuration during the movement of said at least one of either the supporting element (10) or the closing element (11) from the home position towards the working position.

4. The apparatus according to claim 3, also comprising cutting means (28) for cutting the lid (2) from a web or from a larger sheet which is retained above the seat (12) by the retaining device (24), the cutting means (28) being movable between a retracted position and an extracted position, the movement of the cutting means (28) from the retracted position to the extracted position causing, in use, cutting of the lid (2), and wherein said cutting means (28) are movable from the retracted position to the extracted position during the movement of said at least one of either the supporting element (10) or the closing element (11) from the home position towards the working position.

5. The apparatus according to claim 2, wherein the switching between the inactive configuration and the active configuration of the blocking element (22) occurs by means of a movement of the blocking element (22) along a blocking line which is parallel to the movement trajectory (18).

6. The apparatus according to claim 5, also comprising a retaining device (24) which is switchable between a non-operating configuration, in which in use it is uncoupled from the lid (2), and an operating configuration, in which in use it retains the lid (2) and keeps the lid (2) interposed between the supporting element (10) and the closing element (11), the retaining device (24) being kept in the operating configuration during the movement of said at least one of either the supporting element (10) or the closing element (11) from the home position towards the working position.

7. The apparatus according to claim 6, wherein the retaining device (24) comprises an upper retaining element (26) and a lower retaining element (27) which are movable at least one relative to the other between a non-operating position, which corresponds to the non-operating configuration of the retaining device (24) and in which they are spaced apart and uncoupled from each other, and an operating position, which corresponds to the operating configuration of the retaining device (24) and in which they are near and coupled to each other for retaining the lid (2), and wherein, alternatively, either the lower retaining element (27) defines the blocking element (22), or the lower retaining element (27) is part of the supporting element (10).

8. The apparatus according to claim 7, also comprising cutting means (28) for cutting the lid (2) from a web or from a larger sheet which is retained above the seat (12) by the retaining device (24), the cutting means (28) being movable between a retracted position and an extracted position, the movement of the cutting means (28) from the retracted position to the extracted position causing, in use, cutting of the lid (2), and wherein said cutting means (28) are movable from the retracted position to the extracted position during the movement of said at least one of either the supporting element (10) or the closing element (11) from the home position towards the working position.

9. The apparatus according to claim 6, also comprising cutting means (28) for cutting the lid (2) from a web or from a larger sheet which is retained above the seat (12) by the retaining device (24), the cutting means (28) being movable between a retracted position and an extracted position, the movement of the cutting means (28) from the retracted position to the extracted position causing, in use, cutting of the lid (2), and wherein said cutting means (28) are movable from the retracted position to the extracted position during the movement of said at least one of either the supporting element (10) or the closing element (11) from the home position towards the working position.

10. The apparatus according to claim 1, wherein the switching between the inactive configuration and the active configuration of the blocking element (22) occurs by means of a movement of the blocking element (22) along a blocking line which is parallel to the movement trajectory (18).

11. The apparatus according to claim 10, also comprising a retaining device (24) which is switchable between a non-operating configuration, in which in use it is uncoupled from the lid (2), and an operating configuration, in which in use it retains the lid (2) and keeps the lid (2) interposed between the supporting element (10) and the closing element (11), the retaining device (24) being kept in the operating configuration during the movement of said at least one of either the supporting element (10) or the closing element (11) from the home position towards the working position.

12. The apparatus according to claim 11, wherein the retaining device (24) comprises an upper retaining element (26) and a lower retaining element (27) which are movable at least one relative to the other between a non-operating position, which corresponds to the non-operating configuration of the retaining device (24) and in which they are spaced apart and uncoupled from each other, and an operating position, which corresponds to the operating configuration of the retaining device (24) and in which they are near and coupled to each other for retaining the lid (2), and wherein, alternatively, either the lower retaining element (27) defines the blocking element (22), or the lower retaining element (27) is part of the supporting element (10).

13. The apparatus according to claim 12, also comprising cutting means (28) for cutting the lid (2) from a web or from a larger sheet which is retained above the seat (12) by the retaining device (24), the cutting means (28) being movable between a retracted position and an extracted position, the movement of the cutting means (28) from the retracted position to the extracted position causing, in use, cutting of the lid (2), and wherein said cutting means (28) are movable from the retracted position to the extracted position during the movement of said at least one of either the supporting element (10) or the closing element (11) from the home position towards the working position.

14. The apparatus according to claim 11, also comprising cutting means (28) for cutting the lid (2) from a web or from a larger sheet which is retained above the seat (12) by the retaining device (24), the cutting means (28) being movable between a retracted position and an extracted position, the movement of the cutting means (28) from the retracted position to the extracted position causing, in use, cutting of the lid (2), and wherein said cutting means (28) are movable from the retracted position to the extracted position during the movement of said at least one of either the supporting element (10) or the closing element (11) from the home position towards the working position.

15. The apparatus according to claim 14, wherein said cutting means (28) are fixed to the closing element (11) during the movement of said at least one of either the supporting element (10) or the closing element (11) from the home position to the working position.

16. The apparatus according to claim 1, wherein the fixing portion (17) superficially extends parallel to a surface of the contact portion (13) at least when the supporting element (10) and the closing element (11) are in the working position.

17. The apparatus according to claim 1, wherein the closing element (11) has a first contact portion (19) adjacent to the fixing portion (17) and below it, the first contact portion (19) being rounded and curving inwards moving away from the fixing portion (17).

18. The apparatus according to claim 1, wherein at least at the contact portion (13) the lateral surfaces (16) of the seat (12) have a frustopyramidal or frustoconical trend.

19. The apparatus according to claim 1, also comprising a retaining device (24) which is switchable between a non-operating configuration, in which in use it is uncoupled from the lid (2), and an operating configuration, in which in use it retains the lid (2) and keeps the lid (2) interposed between the supporting element (10) and the closing element (11), the retaining device (24) being kept in the operating configuration during the movement of said at least one of either the supporting element (10) or the closing element (11) from the home position towards the working position.

20. The apparatus according to claim 19, also comprising cutting means (28) for cutting the lid (2) from a web or from a larger sheet which is retained above the seat (12) by the retaining device (24), the cutting means (28) being movable between a retracted position and an extracted position, the movement of the cutting means (28) from the retracted position to the extracted position causing, in use, cutting of the lid (2), and wherein said cutting means (28) are movable from the retracted position to the extracted position during the movement of said at least one of either the supporting element (10) or the closing element (11) from the home position towards the working position.

* * * * *